Figure 1:
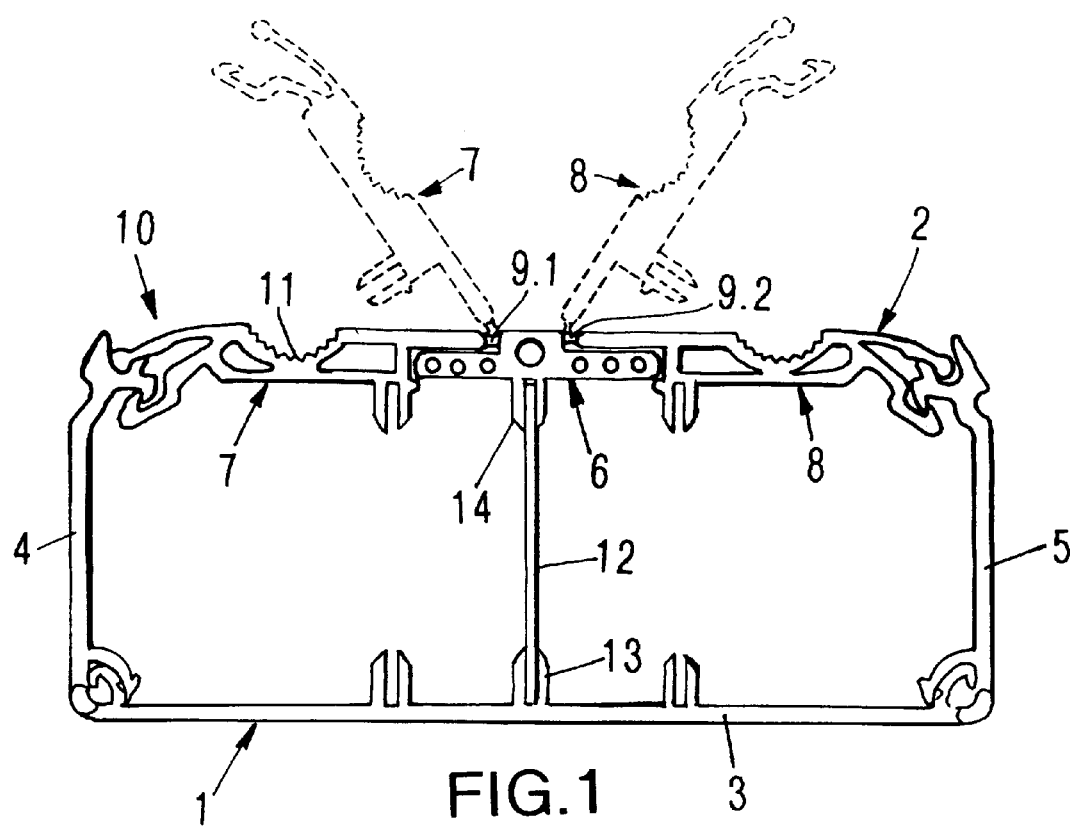

United States Patent [19]
Miranda

[11] Patent Number: 6,029,713
[45] Date of Patent: Feb. 29, 2000

[54] ELECTRIC CABLE CONDUIT

[75] Inventor: Giovanni Miranda, Spaichingen, Germany

[73] Assignee: Hilti Aktiengesellschaft, Schaan, Liechtenstein

[21] Appl. No.: 09/068,279

[22] PCT Filed: Sep. 4, 1997

[86] PCT No.: PCT/EP97/04806

§ 371 Date: May 5, 1998

§ 102(e) Date: May 5, 1998

[87] PCT Pub. No.: WO98/10499

PCT Pub. Date: Mar. 12, 1998

[30] Foreign Application Priority Data

Sep. 5, 1996 [DE] Germany .................... 196 36 007

[51] Int. Cl.[7] .................. F16L 9/22; H02G 3/06
[52] U.S. Cl. ........................ 138/162; 174/65 R
[58] Field of Search ............ 138/162; 174/65 R; 439/471; 339/103 R

[56] References Cited

U.S. PATENT DOCUMENTS

| | | | |
|---|---|---|---|
| 3,757,031 | 9/1973 | Izraeli | 138/162 |
| 3,927,698 | 12/1975 | Johannsen | 138/162 |
| 4,214,803 | 7/1980 | McKee et al. | 339/103 R |
| 4,942,271 | 7/1990 | Corsi et al. | 138/162 |
| 4,990,721 | 2/1991 | Sheehan | 174/65 R |
| 5,620,333 | 4/1997 | Boyle | 439/471 |

*Primary Examiner*—Andres Kashnikow
*Assistant Examiner*—Davis Hwu
*Attorney, Agent, or Firm*—Brown & Wood, LLP

[57] ABSTRACT

In a electric cable conduit provided with one or opposite locking device(s) (10–10.3) for connecting a lid clamp (2, 2.1) with one or both side walls (4–4.4, 5–5.4) of the cable channel (1, 1.1), the lid clamp (2, 2.1) has at least one wing (7–7.4) which is connected with a second wing (8–8.4) or an intermediate member (6) by a flexible hinge (9.1, 9.2)

24 Claims, 5 Drawing Sheets

ELECTRIC CABLE CONDUIT

The invention relates to a lid clamp channel with one or opposite locking device(s) for attaching the clamp to one or both side walls of the electric cable conduit, as well as to a method of its manufacturing.

Electric cable conduits are available in a plurality of forms and shapes. A preferable embodiment of a electric cable conduit is disclosed in European document EP-A-111 799.3 in which there is described a electric cable conduit section formed as a continuous band with wall section-forming segments extending in a longitudinal direction, and with the sections being connected with each other by deformable web hinges which enable the wall section to swing open by 90°, providing a electric cable conduit. In this position, the wall section are held by appropriate locking means.

For such electric cable conduit s, there are provided so-called lid clamps which primarily are used as an auxiliary means during assembly. E.g., these lid clamps are secured to one of side walls of the electric cable conduit so that they extend at an angle to the electric cable conduit. Through the opening, which exists between the lid clamp and the electric cable conduit, conductors are inserted. It is insured that these conductors would not fall out of the electric cable conduit.

With an overhead assembly, the lid clamp is attached at opposite sides of a electric cable conduit so that it supports the cable weight. This insures that the cable does not lie on the covering lid of the electric cable conduit itself, which lid, advantageously, should be releasably connected with the side walls. In this case, the lid clamp prevents application of a too high weight pressure to the conduit lid.

Further, such lid clamps provide for the side wall stabilization as they form an abutment for a later mountable conduit lid. With this, the electric cable conduit lid is held with a light preload. Still further, the lid clamps serve as clamping means for stabilizing additional separation walls inside the conduit.

Also known are partial lid clamps which, e.g., insure access only to one predetermined chamber, while all other chambers of the electric cable conduit remain closed.

The drawbacks of the known lid clamp consists primarily in their relatively expensive manufacturing due to the use of complicated form tools and their limited handling possibilities, and also in that for their handling, as a rule, two hands need to be used.

The object of the present invention is to eliminate these drawbacks.

This object is achieved, in the first place, by providing a lid clamp having at least one wing connected by a flexible hinge with a second hinge or an intermediate member.

According to the method of the present invention, the at least one wing is formed, connected with another part of the lid clamp by a flexible hinge, in an extrusion (co-extrusion) process, so that a hinge is provided which is not damaged even at a repeated use or when used at a relatively low temperatures. Advantageously, e.g., a non-rigid PVC is used for the wing and another part of a lid clamp.

The manufacturing in a form of a continuous profile has an advantage consisting in that a lid clamp of a predetermined width can be cut off of this continuous profile.

An arrangement of an intermediate member, e.g., between two wings is recommended, first of all, when the electric cable conduit is separated with a central wall into two chambers or compartments. In this case, the intermediate member can be mounted on the central wall, with each wing bridging one compartment. There exists a possibility that one wing would be in its closed position while the other wing is open. Then, corresponding conductors can be inserted into the other chamber, whereas the conductors in the first chamber are secured with the closed wing.

A further feature of the present invention relates to a locking device. This one has a detent deflectable in a direction transverse to the longitudinal direction of the electric cable conduit and which, in a closed position, forms a locking connection with a hook provided on the lid clamp, or with a marginal strip provided on a side wall.

The advantage of this detent consists in that pressure of a single finger is sufficient to deflect it, whereby the locking connections is broken. In the preferred embodiment, this detent is applied to front portion so that an overhead action is possible.

There exist several possibilities of forming the locking device. Below, several advantageous possibilities would be described.

In a simplest case, the locking connection consists of a detent nose provided on a detent which abuts a shoulder of a hook. In another case, it is contemplated to provide a locking connection consisting of a detent nose formed on a marginal strip and abutting a detent shoulder. Both possibilities are equivalent. In one of the embodiment, the detent is connected with a side wall, e.g., a component of a free edge of the side wall. Here, the detent is arranged between a marginal strip and a support strip, with the marginal strip being provided with a per se known groove for receiving per se known bent-out section of a electric cable conduit lid. A free space is provided between the marginal strip and the lid, which enables deflection of the detent with respect to the marginal strip. Between the detent and the support strips, a receiving chamber for a hook is provided. At that, the detent and the support strips together are connected with a side wall of the electric cable conduit by a support arm. The end of the support strip is so formed that it abuts the lid clamp from below, with an end bulge of the support strip engaging in a corresponding indentation of the lid clamp.

To insure the deflection of the detent, it should have a reduced-thickness region in the vicinity of the support arm.

At the opposite end, the detent has a pressure member, bent at a right angle, to which pressure can be applied with a finger.

In an improved embodiment, the detent is connected with the lid clamp itself. This is effected with an arch formed of reduced-thickness material, which provides for detent deflection in the same manner as the above-described reduced thickness region.

For securing the detent to the side wall of the electric cable conduit, a recess is provided between the marginal strip, which simultaneously serves for retaining the cable conduit lid, and an inner strip. In this case, the marginal strip also includes the above-mentioned detent nose which, in the closed position, overlies the shoulder of the detent.

There is also possible to provide, on the detent, a plurality of shoulders spaced from each other, which are overlaid by the detent nose. Thereby, the opening position can be changed, which is desirable in many cases. In this case, advantageously, an annular recess between the marginal and inner strips is provided, so that here, the arch and the detent can pivot.

To insure an automatic bouncing of a wing during opening of the lid clamp, the wing should be connected with the intermediate member in the locking position with some pre-load. This, e.g., can be insured by having a support shoulder of the intermediate member, which extend upwardly, pressing against a corner bead of the wing. Other possibilities also exist which are within the scope of the present invention.

Figure 2:
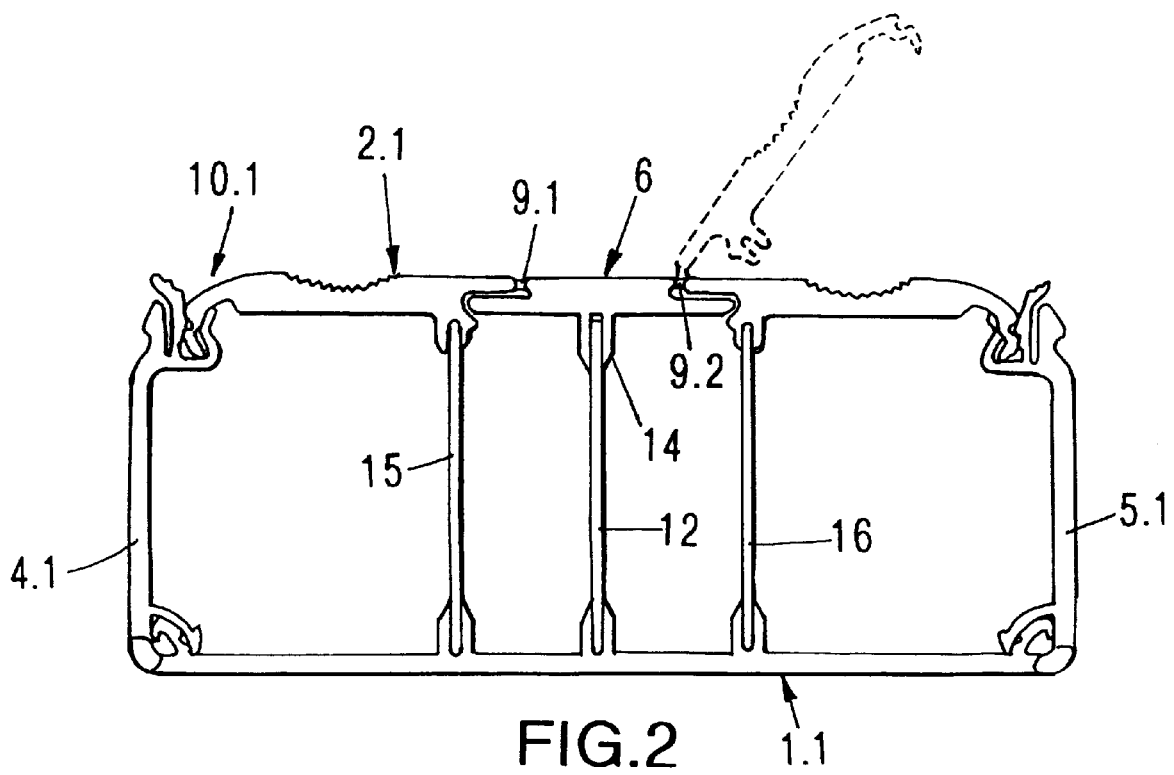
Figure 3:
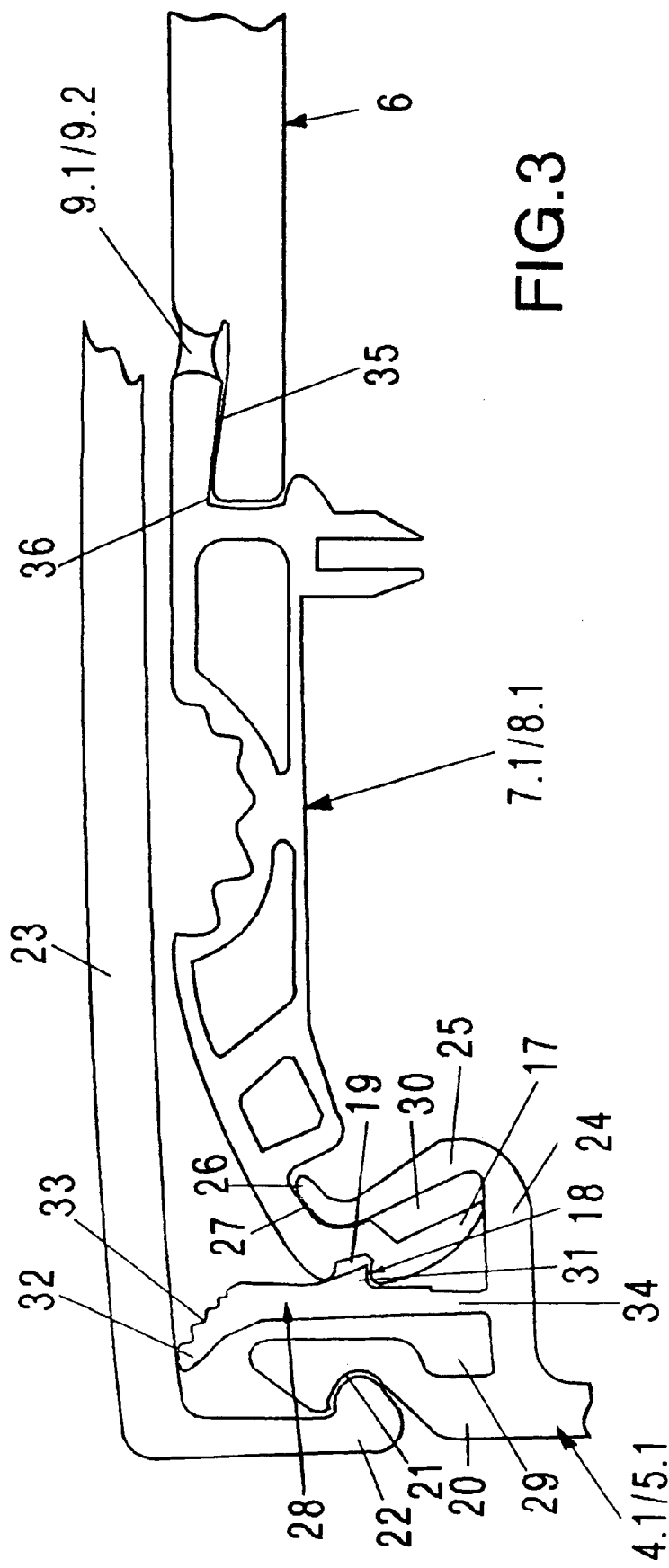
Figure 4:
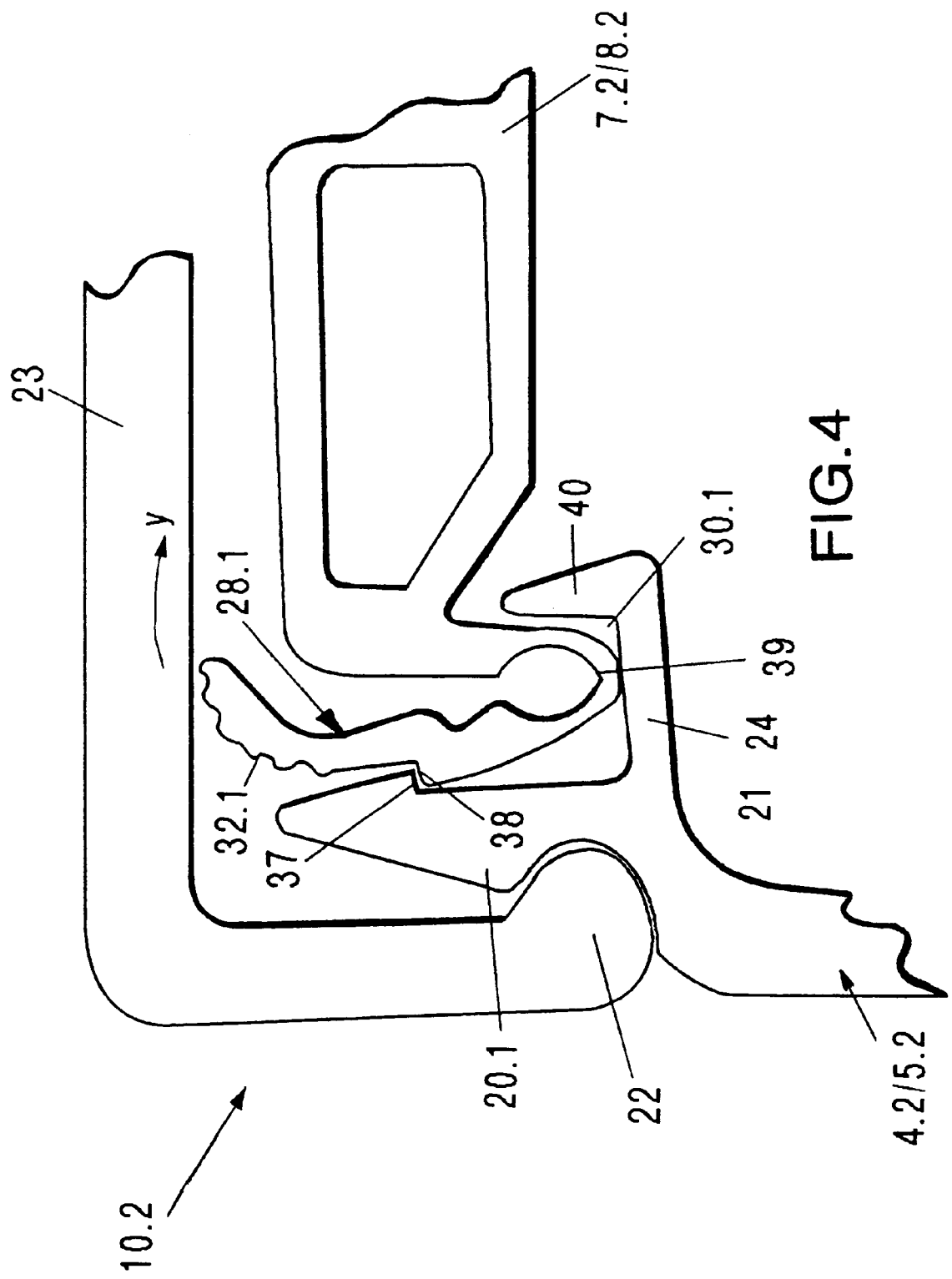
Figure 5:
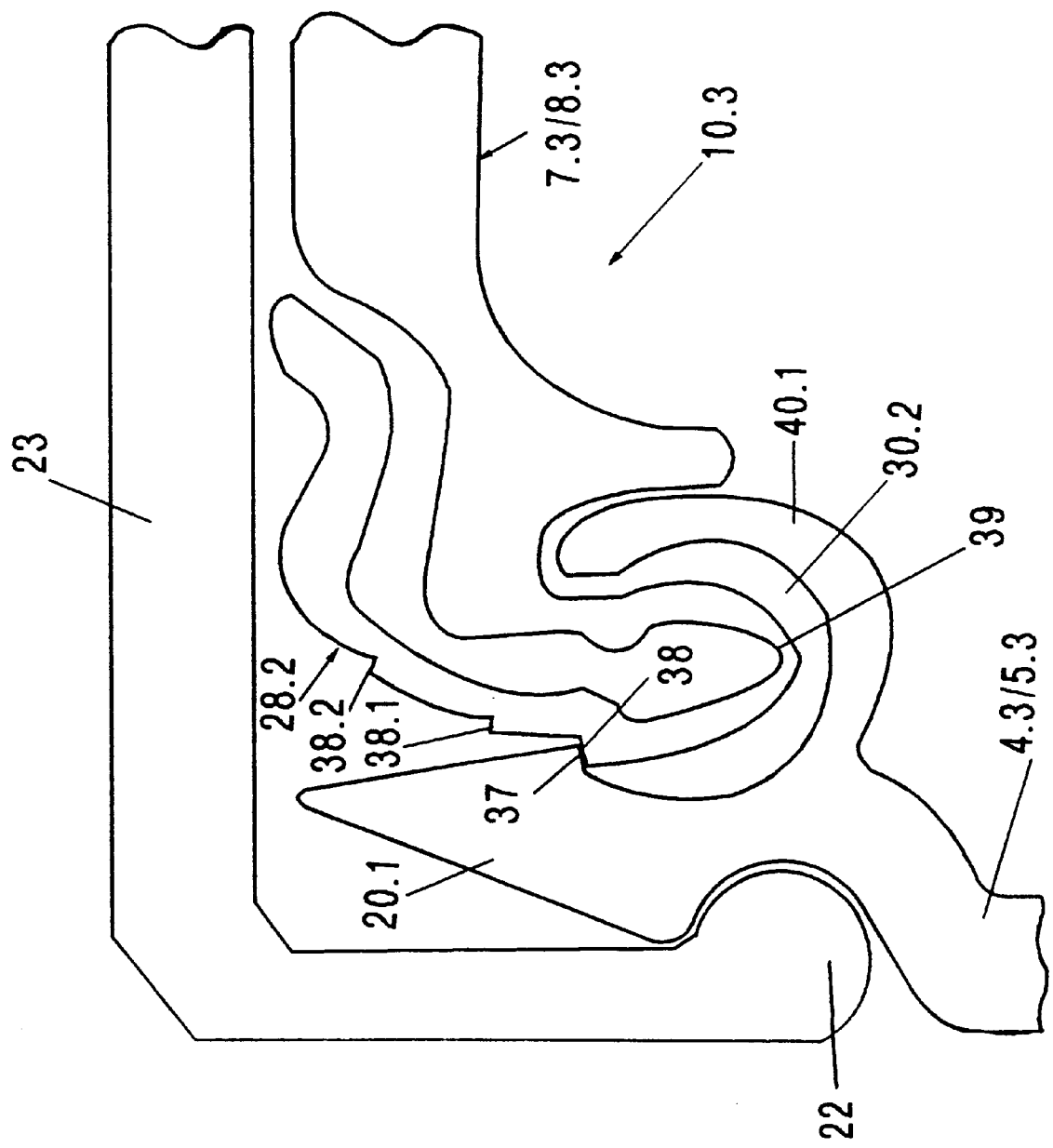
Figure 6:
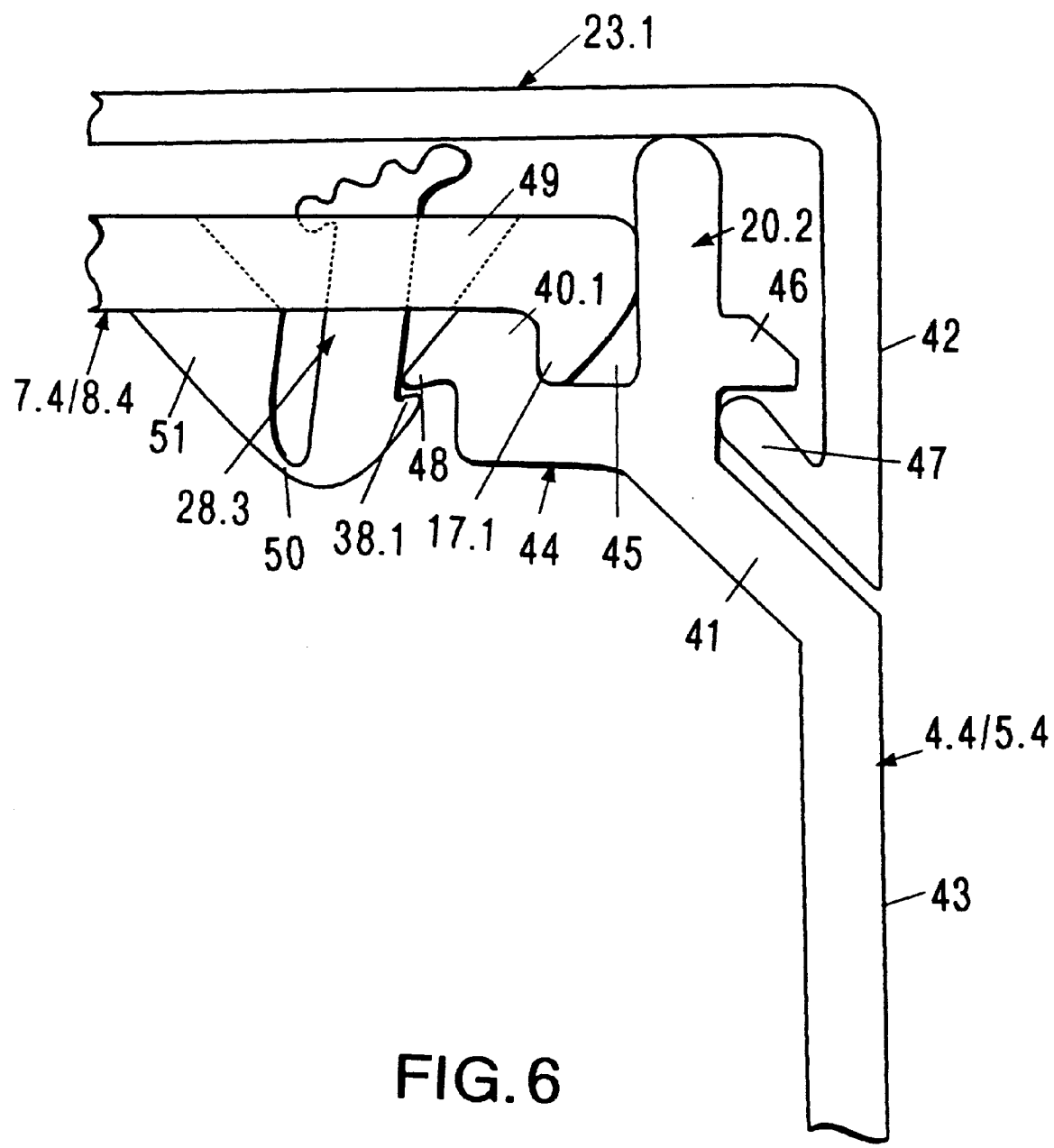

Further advantages, features and particularities of the invention will become apparent from the following detailed description of preferred embodiments with reference to the drawings; the drawings show in:

FIG. 1 a cross-sectional view of a electric cable conduit with an inserted lid clamp in two use positions;

FIG. 2 a cross-sectional view of another embodiment of a electric cable conduit with an inserted lid clamp in two use positions;

FIG. 3 a cut-out, at an increase scale, of a corner region between a side wall of a electric cable conduit and the lid clamp; and FIGS. 4–6 cut-outs of another embodiments of connections between a lid clamp and a electric cable conduit.

FIG. 1 shows a connection of a lid clamp 2 with a electric cable conduit 1. In the shown embodiment, the electric cable conduit 1 is formed of a continuous profile, as described in EP-A 95 111 799.3. Therefore, a detailed description of the electric cable conduit will be omitted. Anyway, the present invention can be used with any other electric cable conduit. In any case, the electric cable conduit 1 has a rear wall 3 and two side walls 4 and 5.

The lid clamp 2 consists of an intermediate member 6 and two wings 7 and 8. The wings 7 and 8 are connected with the intermediate member 6 by hinges 9.1 and 9.2 which are formed as flexible hinges. According to the present invention, the intermediate member 6, together with the wings 7 and 8 and the hinges 9.1 and 9.2, are produced as a continuous profile by a co-extrusion process. Thereafter, the lid clamp 2 of a desired width is cut off from the produced continuous profile.

In a closed position, each of the wings 7 and 8 of the lid clamp 2 is lockingly connected with a respective side wall 4 and 5 of the electric cable conduit 1, with the locking connection being insured by a locking device 10. Different embodiments of the locking devices are shown in FIGS. 1 through 5. The locking device 10, which is shown in FIG. 1, is a commercially available device, whereas the locking devices shown in FIGS. 2 through 5 represent new locking devices.

In FIG. 1, both wings 7 and 8 are shown in their closed positions, in which they are connected with the side walls 4 and 5 of the electric cable conduit 1. Open positions of the wings are shown with dash lines. When the wings 7 and 8 move from their open position into their closed position, the wings 7 and 8 pivot about their flexible hinges 9.1 and 9.2, respectively, and are pressed in a respective gripping recess 11 with a finger of a person's hand. The gripping recess 11 can additionally be provided with fluting.

Advantageously, the shaped section for the wings 7 and 8, not shown, represents a hollow profile, which insures rigidness at a reduced weight.

The attachment of the lid clamp 2 to the electric cable conduit 1 is effected by placing of the intermediate member 6 on a central wall 12 which is inserted into respective fork prongs 13 and 14 on the rear wall 3 of the electric cable conduit 1 or on the intermediate member 6. There are also provided further fork prongs, which are not discussed further, for receiving, if necessary, further walls 15 and 16, as shown in FIG. 2.

A first embodiment of a locking device 10.1 according to the present invention is shown in FIGS. 2 and 3. An end of the wing 7.1/8.1 is formed as a hook 17 provided with a shoulder 18. A recess 19 is formed in the hook 17.

The side wall 4.1/5.1 of the electric cable conduit 1.1 is divided in three sections in its edge region. There is provided an outer marginal strip 20 in the outer surface of which a groove 21 is formed. The groove 21 serves for receiving an end section 22 of a lid 23 for the electric cable conduit 1.1. The end section 22 and the groove 21 form a releasable locking connection.

A support arm 24 projects from the side wall 4.1/5.1 in a horizontal direction. The support arm 24, at its end, passes into a support strip 25 which is bent upward forming a s-shaped section. In the closed position, an end bulge 26 of the supported strip 25 engages the wing 7.1/8.1 which is provided with a bulge 27 in this region.

A detent 28 projects from the support arm 24 upward in a region between the marginal strip 20 and the support strip 25. The detent 28 forms a free space 29 with the marginal strip 20 and forms, with the support strip 25, a receiving space 30 for the hook 17. A detent nose 31 projects into the receiving space 30 from the detent 28. The detent nose 31 narrows the receiving space 30 and, in the closed position, lies on the should 18. This insures locking of the wing 7.1/8.1 with the side wall 4.1/5.1. At the end of the detent 28, there is provided a narrowed pressure section 32 with fluting 33. At its other end, the detent 28 is connected to the support arm 24 with a reduced width region 34 which provides for bending of the detent 28 outwardly toward the marginal strip 20.

When the detent 28 bends outwardly toward the marginal strip 20, the free space 29 is reduced, the detent nose 31 becomes disengaged from the should 18, releasing the hook 17 and, thereby, the wing 7.1/8.1. With this embodiment of a electric cable conduit 1.1 and the lid clamp 2.1, in the closed position, the wing 7.1/8.1 is connected with the intermediate member 6 with a pre-load. The pre-load is generated by a slopping support shoulder 35 provided on the intermediate member 6 and which engages, in a closed position, in a corner bead of the wing 7.1/8.1 and is pressed against this corner bead. The present invention functions as follows:

The electric cable conduit 1.1 is secured, e.g., on a wall or a ceiling. Then, if necessary, the center wall 12 or sectional walls 15 and 16 are mounted in the electric cable conduit 1.1., a cable is inserted and is temporary secured with the lid clamp 2.1. At that, the clamp lid is secured on the center wall 12, with the fork prongs 14, which are provided on the intermediate member 6, being pushed over the center wall 12.

For connecting the wings 7.1/8.1 with respective walls 4.1 and 5.1 of the electric cable conduit 1.1, the wings 7.1/8.1 are pivoted about respective hinges 9.1/9.2 until the hook 17 engages a respective receiving space 30 and the shoulder 18 is located under a respective detent nose 31. At that, the shoulder 18 is operatively supported by the bulge 26 of the support strip 25 so that the wing 7.1/8.1 would not open inadvertently.

The final covering of the electric cable conduit 1.1 is effected by appropriately positioning the lid 23, with the end section 22 engaging in a respective groove 20 of the marginal strip 20.

For opening of the electric cable conduit 1.1, first, the lid 23 is lifted. Then, a pressure is applied, e.g., with a thumb to the pressure member 32 of the detent 28, which lifts the nose 31 from the shoulder 18. Because the wing 7.1/8.1 is pre-loaded, the wing 7.1/8.1 jumps upward, opening the interior of the electric cable conduit 1.1.

In the embodiment of a locking device 10.2, which is shown in FIG. 4, for connecting a wing 7.2/8.2 with a side wall 4.2/5.2 of a electric cable conduit, only two additional elements, provided on the side wall 4.2/5.2 are necessary. A marginal strip 20.1 serves, as it has been described with reference to the locking device 10.1, for retaining the lid 23, and is provided to that end with a groove for receiving the end section 22. Opposite to the groove 21, the marginal strip 20.1 has a detent nose 37 which cooperates with a shoulder 38 provided on a detent 28.1. This detent is connected in this embodiment with the wing 7.2/8.2., to this end, an arch 39 is formed between the wing 7.2/8.2 and the detent 28.1 which insures bending of the detent 28.1 about this arch in a direction y. This takes place when a person's hand acts on the pressure member 32.1 which is formed at free end of the detent 28.1.

The arch 39 extends in a receiving space 30.1 between the marginal strip 20.1 and an inner strip 40 projecting from the support arm 24.

This locking device functions in the same manner as the device shown in FIG. 2, with only the detent 28.1 moving not outwardly but rather inwardly toward the wing 7.2/8.2 during the release of the wing.

A further embodiment of a locking device according to FIG. 5 is similar to that of FIG. 4.

Here also, a corresponding marginal strip 20.1 is connected with a side wall 4.3/5.3 of a electric cable conduit and serves for retaining the lid 23 and a detent 28.2. At that, an arcuate receiving space 30.2 is formed between the marginal strip 20.1 and an inner strip 40.1 so that an arch 39 can be displaced between the wing 7.3/8.3 and the detent 28.2 This enables to retain the wing 7.3/8.3 in different opening positions. To this end, shoulders 38, 38.1, and 38.2 spaced from each other are provided on the detent 28.2. In this embodiment, the intermediate member and a second wing are eliminated so that only one wing is connected with the side wall 4.3/5.3 by the locking device 10.3, with the wing 7.3/8.3 being retained in different opening positions with respect to the electric cable conduit.

In another embodiment of a connection of a lid clamp and the electric cable conduit, the lid 23.1 engages over a side wall 4.4/4.5, with the side wall being provided with a bent-inward end strip 41 in its upper region. This insures that the outer surface 42 of the lid 23.1 lies in the same plane as the outer surface 43.

A U-shaped section 44 adjoins the bent-inward strip 41. The section 44 forms a receiving conduit 45 for a hook 17.1 of a wing 7.4/8.4. This receiving space 45 is bordered on one side with a marginal strip 20.2 and on the other side with an inner strip 40.1. A nose 46 projects outwardly from the marginal strip 20.2 and is engaged, in the use position, with a hook 47 provided on the lid 23.1.

A detent nose 48 projects from the inner strip 40.1 into the interior of the electric cable conduit and is engaged from beneath, in the use position, by a shoulder 38.1 of a detent 28.3. This detent 28.3, e.g., projects through an opening 49 formed in the wing 7.4/8.4 and is connected by a flexible region 50 with a support section 51 on the lower surface of the wing 7.4/8.4.

A big advantage of this arrangement consists in that little space is required for securing the wing 7.4/8.4 in the electric cable conduit which becomes available for placing another elements therein.

I claim:

1. A lid clamp for bridging an opening of an electric cable conduit (1,1.1) transversely to a longitudinal extent of the conduit, the conduit having a rear wall and two spaced upright walls defining the opening, the lid clamp (2,2.1) comprising a first wing (7,7.4); at least one of a second wing (8,8.4) and an intermediate member (6); and flexible hinge means (9.1,9.2) for connecting the first wing (7,7.4) with the at least one of a second wing (8,8.4) and intermediate member (6).

2. A lid clamp for bridging an opening of an electric cable conduit (1,1.1) transversely to a longitudinal extent of the conduit, the conduit having a rear wall and two spaced upright walls defining the opening, with at least one of the upright walls (4–4.4,5–15.5) having one of a marginal strip (20.1), an inner strip (40.1), and a detent nose (48) and provided with locking means including a detent (28–28.3) bendable transversely to the longitudinal extent of the conduit, the lid clamp comprising at least one wing; and hook means (17) provided at a free end of the at least one wing for connecting the at least one wing with the at least one of the upright walls in a closed position of the lid clamp, the detent (28–28.3) forming a locking connection with one of the hook means (17), the marginal trip (20.1) the inner strip (40.1), and the detent nose (48) in the closed position of the lid clamp.

3. A method of manufacturing a lid clamp for bridging an opening of an electric cable conduit (1,1.1) transversely to a longitudinal extent of the conduit with the conduit having a rear wall and two spaced upright walls defining the opening, the lid clamp (2,2.1) comprising a first wing (7,7.4); at least one of a second wing (8,8.4) and an intermediate member (6); and flexible hinge means (9.1, 9.2) for connecting the first wing (7,7.4) with the at least one of a second wing (8,8.4) and intermediate member (6), the method comprising the steps of extruding a continuous profile having a cross-section corresponding to cross-section of the lid clamp; and cutting a lid clamp of a predetermined width from the continuous profile.

4. A lid clamp according to claim 2, wherein locking connection is formed by engagement of the a detent nose (31) provided on the detent (28) with a shoulder (18) of the hook (17).

5. A lid clamp according to claim 2, wherein the locking connection is formed by engagement of the detent nose (37) provided on the marginal strip (20.1) with a shoulder (38–38.2) of the detent (28.1,28.2).

6. A lid clamp according to claim 5, wherein a plurality of shoulders (38–38.2) engageable with the detent nose (37) is provided on the detent (28.2).

7. A lid clamp according to claim 2 wherein the detent (28) is connected with at least one of the upright walls (4.1, 5.1).

8. A lid clamp according to claim 7, wherein the detent (28) is arranged between the marginal strip and a support strip (25) provided on the at least one of the upright walls.

9. A lid clamp according to claim 8, wherein the marginal strip (20) has a groove (21) for receiving an end section (22) of a lid clamp (23).

10. A lid clamp according to claim 8, wherein a free space (29) is provided between the marginal strip (20) and the detent (28).

11. A lid clamp according to claim 10, wherein a receiving space (30) for the hook (17) is provided between the detent (28) and the support strip (25).

12. A lid clamp according to claim 10, wherein the detent (28) and the support strip (25) are connected with the at least one of the upright walls (4.1, 5.1) by a support arm (24).

13. A lid clamp according to claim 8, wherein the support strip (25) has a bulge (26) abutting a bulge (27) of the lid clamp (2.1).

14. A lid clamp according to claim 13, wherein the detent (28) is connected with a support arm (24), which connects the support strip (25) and the detent (28) with the at least one of the upright walls, with a narrowed region (34) and is provided with a deflectable pressure member (32) at a free end thereof.

15. A lid clamp according to claim 2, wherein the detent (28.1, 28.2, 28.3) is connected with at least one wing (7.2, 8.2; 7.3, 8.3; 7.4, 8.4) of the lid clamp.

16. A lid clamp according to claim 15, wherein the detent (28.1, 28.2, 28.3) is connected with the lid clamp by one of an arch (39) and a flexible region (50) formed of a material having a reduced width.

17. A cable channel according to claim 15, wherein the detent (28.1, 28.2) is arranged in a recess (30.1, 30.2) provided between the marginal strip (20.1) and the inner strip (40, 40.1).

18. A lid clamp according to claim 17, wherein the recess (30.2) has an arcurate cross-section.

19. A lid clamp according to claim 15, wherein the detent (28.3) extends through an opening (49) formed in at least one wing (7.4, 8.4).

20. A lid clamp according to claim 19, wherein the hook (17.1) is located after the opening (49) engages in a receiving conduit (45) formed by a U-shaped section (44) provided on at least one of the upright walls (4.4, 5.4).

21. A lid clamp according to claim 20, wherein the U-shaped section (44) has an inner strip (40.1) and a further marginal strip (20.2), and wherein the detent nose (48) projects from the inner strip (40.1), and wherein a nose (46) for engaging the lid clamp (23.1) projects from the marginal strip (20.2).

22. A lid clamp according to claim 1, wherein the wing (7.1, 8.1), in a locking position, engages the intermediate member (6) with a preload.

23. A cable channel according to claim 22, where in the intermediate member (6) has a slopping support shoulder (35) which is pressed against a comer bead of the first wing (7.1, 8.1).

24. A method according to claim 3, wherein the extruding step includes extruding a continuous profile the cross-section of which corresponds to a cross-section of a lid clamp in which the first and second wings are arranged on opposite sides of the intermediate member and are connected with the intermediate member by flexible hinges.

* * * * *